Patented Nov. 19, 1940

2,221,828

UNITED STATES PATENT OFFICE 2,221,828

ESTERS OF AMINO ALCOHOLS WITH 9-HYDROXYFLUORENE-9-CARBOXYLIC ACID AND PROCESSES FOR THEIR PRODUCTION

Otto Wolfes and Otto Hromatka, Darmstadt, Germany, assignors to Merck & Co. Inc., Rahway, N. J., a corporation of New Jersey No Drawing. Application April 6, 1937, Serial No. 135,259. In Germany April 25, 1936

4 Claims. (Cl. 260—247)

This invention relates to certain new esters of amino alcohols having a tertiary amino group, which esters are suitable for use as spasmolytics.

In U. S. application Serial No. 81,026, filed May 21, 1936, we have disclosed a method of preparing the diphenylglycolic acid (benzylic acid) ester of the amino alcohol, pseudotropine. The pharmacological properties of this ester were shown to be superior to those of the well-known esters of tropine, atropine and homatropine, both of which have found wide use in the medicinal field.

We have now found that esters of amino alcohols having a tertiary amino group, of the type of pseudotropine, with diphenyleneglycolic acid (known as 9-hydroxyfluorene-9-carboxylic acid in Beilstein nomenclature) likewise possess pharmacological properties which are superior to those of the known spasmolytics.

It is particularly interesting that even simply constructed and easily synthesized hydroxyamines having a tertiary amino group, the hydroxy-carboxylic acid or benzilic acid esters of which do not possess any particularly valuable therapeutic properties, [K. Fromherz Arch. Exp. Path. (1933) vol. 173, #1, p. 86–128], form esters with 9-hydroxyfluorene-9-carboxylic acid which exhibit pharmacological effects which are superior to the known compounds.

These new esters may be obtained by reacting upon the selected amino alcohol either in the free state or in the form of a salt, with 9-hydroxyfluorene-9-carboxylic acid. For example, the two materials may be heated with or without a solvent, with the addition of acid, if necessary, or the esterification may be carried out by means of re-esterification, by reacting esters of 9-hydroxyfluorene-9-carboxylic acid with the appropriate amino alcohol.

It is also possible, and in many cases advantageous, to replace the hydroxyl group of the 9-hydroxy-fluorene-9-carboxylic acid, before esterification, by a group which can later be re-substituted to the hydroxyl. Aside from the possibility of employing acyl derivatives, a particularly suitable method of working in this manner comprises esterifying the amino alcohol with 9-halogen-fluorene-9-carboxylic acid halide and, thereafter, reconverting the halide in the ester obtained into the hydroxyl group by means of hydrolyzing agents, such as sodium acetate, silver acetate, and ammonia, for example. The use of 9-chlorohydroxyfluorene-9-carboxylic acid chloride has proved satisfactory with most amino alcohols.

In certain cases, it will be found advantageous to first produce esters of 9-hydroxyfluorene-9-carboxylic acid with chlorinated alcohols and to then treat these with secondary amines.

The specific examples given below are given by way of illustrating preferred methods of carrying out our invention. Obviously, the steps described may be modified considerably without departing from the spirit of the invention substantially as described and claimed, and it is understood that we do not desire to limit ourselves to the specific embodiments shown.

Examples

1. About 17.8 parts of pseudotropine-hydrochloride are heated for about 3 hours to 140° with about 31.4 parts of 9-hydroxyfluorene-9-carboxylic acid chloride. The melted substance is cooled, and from it is obtained hydrochloride of pseudotropine - chloro - fluorene - carboxylic acid ester, which is slightly soluble in water and which melts at 243°, under decomposition. A warm, aqueous solution of this ester is ammoniated, and extracted with ether. The ether is evaporated. The base, pseudotropine-hydroxy-fluorene-carboxylic acid ester, remains as the ether residue. After recrystallization, it melts at 171–172°. It has the formula $C_{22}H_{23}O_3N$. Crystallized salts, such as the neutral sulfate containing water of crystallization may be produced from this base.

2. About 11.7 parts of $\beta$-diethylamino-ethyl alcohol, 22.6 parts of 9-hydroxyfluorene-9-carboxylic acid, and 14.6 parts of 25% hydrochloric acid are heated for about 5 days on a boiling water bath. A small amount of 1% hydrochloric acid is added daily. The reaction mixture is dissolved in water and ether. The acidic, aqueous solution is extracted with ether and, after treatment with ammonia, a precipitate is obtained which is shaken out with ether. The ether solution is evaporated. The residue is converted into the crystallized diethyl-amino-ethanol-hydroxy-fluorene carboxylic acid ester hydrochloride by treatment with alcoholic hydrochloric acid. It has the formula $C_{20}H_{23}O_3N.HCl$, and melts at about 208°.

3. About 13.1 parts of $\beta$-hydroxy-ethyl-morpholine and 24 parts of 9-hydroxyfluorene-carboxylic acid methyl ester are heated for about 5 hours to 120°, in an open flask. The melted material is dissolved in ether, and the ether solution extracted with diluted hydrochloric acid. By treating the hydrochloric acid solution with ammonia, 16 parts of crystallized hydroxy-ethyl-morpholine-hydroxyfluorene-carboxylic acid ester are obtained. After recrystallization from alcohol, it melts at about 160°. It has the formula $C_{20}H_{21}O_4N$. Crystallized salts may be obtained from the base. The hydrochloride has the formula $C_{20}H_{21}O_4N.HCl$, and melts at about 209°.

4. About 14.1 parts of tropine and 24 parts of hydroxyfluorene-carboxylic acid methyl ester are heated for about 1 hour to 125° in an open flask. The melted material is dissolved in ether and diluted hydrochloric acid. The formed layers are separated and the hydrochloric acid solution is ammoniated, and extracted with ether. The ether solution is evaporated. The crystalline residue which remains is purified by recrystallization. The pure tropine-hydroxyfluorene-carboxylic acid ester has the formula $C_{22}H_{23}O_3N$, and melts at about 175°.

5. About 39.8 parts of d-pseudo-ecgonine-methyl ester in 100 parts of benzol are mixed with 26.3 parts of chloro-fluorene-carboxylic acid chloride in 100 parts of warm benzol, and heated for about two hours to about 60°. The cooled mixture is treated with just enough diluted hydrochloric acid and water to redissolve the oily precipitate obtained. The acidic solution is repeatedly extracted with ether. It is ammoniated, and the separated base is taken up in ether. The ether is evaporated. The base remaining, d-pseudo-ecgonine-methyl-chloro-fluorene-carboxylic acid ester, is purified over the hydrochloride, $C_{24}H_{24}O_4NCl.HCl$ of the melting point 224°, or dissolved directly in diluted acetic acid mixed with a hot aqueous solution of the equivalent quantity of silver acetate, and heated to 80° for a short time. The excess silver acetate is precipitated with hydrochloric acid. After filtering off the silver chloride, the d-pseudo-ecgonine-methyl-hydroxyfluorene-carboxylic acid ester is precipitated with ammonia, and extracted with ether. After recrystallization from methanol, it melts at about 151°.

6. About 31.8 parts of methyl-ethyl-diethylamino-methyl carbinol are dissolved in about 100 parts of benzol and boiled for about six hours, with refluxing, with a solution of 26.3 parts of chlorofluorene-carboxylic acid chloride in 100 parts of benzol. The reaction mixture is extracted with diluted hydrochloric acid. The chlorofluorene-carboxylic acid ester of the amino alcohol is freed from the acidic aqueous solution with ammonia and extracted with ether. The ether residue is dissolved in diluted acetic acid and warmed for an hour on the boiling water bath with a 5% solution of an equal volume of sodium acetate. After treatment with diluted hydrochloric acid, the acidic solution is extracted with ether. The base is freed by treatment with ammonia, and extracted with ether. Methyl-ethyl-diethylamino-methyl-carbinol-hydroxyfluorene-carboxylic acid ester, remains as the ether residue. It is converted to its hydrochloride having the formula $C_{23}H_{29}O_3N.HCl$.

7. About 59.8 parts of anhydrous codeine are dissolved in 120 parts of hot benzol, mixed with a solution of 26.3 parts of chloro-fluorene-carboxylic acid chloride in 100 parts of benzol and boiled for about 3 hours, with refluxing. The separated crystals are filtered off. The benzol solution is digested with diluted hydrochloric acid. It yields a difficultly soluble salt which is separated from the benzol solution and the hydrochloric aqueous solution, dissolved in hot water, and converted into the base by treatment with ammonia. The base is dissolved in diluted acetic acid and heated with an aqueous solution of silver acetate. By precipitation with an excess of ammonia, crystalline hydroxyfluorene-carboxylic acid ester of codeine is obtained and recrystallized from chloroform. It has a melting point of about 258° under decomposition, and has the empirical formula $C_{32}H_{29}O_5N$. The base can be converted into the desired salts.

8. About 13.1 parts of β-hydroxyethyl morpholine and 28.2 parts of 9-acetoxyfluorene-9-carboxylic acid methyl ester are heated in an open flask for 5 hours to 130°. The further steps of the process are carried out in accordance with Example 3. The acetyl group is split off and hydroxy-ethyl-morpholine-hydroxyfluorene-carboxylic acid ester having the formula $C_{20}H_{21}O_4N$ is obtained.

9. About 22.6 parts of hydroxyfluorene-carboxylic acid free from water of crystallization are heated for about 20 hours on a boiling water bath with 40 parts of ethylene-chlorhydrin and 2 parts of concentrated sulfuric acid. Water is added, and the formed ester separates as an oil. The layers are separated, and the ester is dissolved in ether and shaken with soda solution to remove any unchanged hydroxyfluorene-carboxylic acid. The ether solution is dried and evaporated. The residue (23.1 parts) is heated for about six hours in a pipe to 130° with 12 parts of diethylamine and 50 parts of benzol. The diethylamine-hydrochloride is filtered off and the benzol solution extracted with hydrochloric acid. The formed base is precipitated from the acidic solution with ammonia, and extracted with ether. Diethylamino-ethanol-hydroxyfluorene-carboxylic acid ester (9 parts) remains as ether residue. It is converted, in alcoholic solution, into its hydrochloride and recrystallized; the hydrochloride has a melting point of about 208°.

10. About 23.4 parts of diethylamino-ethanol are disolved in 60 parts of benzol, mixed with a warm solution of 35.2 parts of bromo-fluorene carboxylic acid bromide and heated for about 2 hours to 60°. The benzol solution is separated from the extracted salt and shaken out with diluted hydrochloric acid. The hydrochloric acid solution is ammoniated and extracted with ether. The ether is evaporated and the residue heated to 90° in acetic acid solution with silver acetate. Hydrochloric acid is added and the silver halides are filtered off. The filtrate is ammoniated and extracted with ether. Diethylamino-ethanol-hydroxyfluorene carboxylic acid ester remains as the ether residue. It is converted into its hydrochloride, which, after recrystallization, melts at about 208°.

11. About 25.8 parts of N-β-hydroxy-ethyl piperidine in 50 parts of benzol are mixed with a solution of 26.3 parts of chloro-fluorene-carboxylic acid chloride in 100 parts of warm benzol and heated for 3 hours to 60°. The cooled mixture is treated with enough diluted hydrochloric acid and water to redissolve the separating precipitate. The acidic solution is separated from the benzol solution and extracted with ether several times. It is ammoniated and the separated base taken up in ether. The hydroxyethyl piperidine-chlorofluorene carboxylic acid ester remaining after evaporation of the ether (28 parts) is dissolved in absolute alcohol and converted into its hydrochloride, $C_{21}H_{22}O_2NCl$, which melts at 184°.

The aqueous solution of this salt is boiled for two hours. After cooling, the congo-acidic solution is ammoniated, and the hydroxyethyl-piperidine-hydroxyfluorene carboxylic acid ester precipitates. It has the formula $C_{21}H_{23}O_3N$, and melts at about 136°.

12. About 28.2 parts of pseudotropine are dissolved in about 140 parts of benzol at about 60°, mixed with a solution of about 29 parts of 9-chlor-fluorene-carboxylic acid-9-chloride in about 58 parts of benzol and heated for 1 hour to 60°. Water and diluted hydrochloric acid are added until the mixture is acid to Congo. The slightly soluble, crystalline hydrochloride of pseudotropine-chlor-fluorene carboxylic acid ester is precipitated, from which the pseudotropine-hydroxyfluorene-carboxylic acid ester is obtained as in Example 1.

13. About 17.8 parts of pseudotropine-hydrochloride, 22.6 parts of 9-hydroxyfluorene-9-carboxylic acid and 12 parts of water, together with a few drops of diluted hydrochloric acid are heated for about 24 hours in a dish on the boiling water bath. The reaction mixture is dissolved in water and ether. The acidic aqueous solution is extracted several times with ether. The solution is treated with ammonia, and a precipitate is obtained, which is shaken out with ether. The ether solution is evaporated. Crystalline pseudotropine-hydroxyfluorine-carboxylic acid ester is obtained which, after recrystallization from alcohol, melts at about 170°–172°.

14. About 14.1 parts of pseudotropine and 24 parts of 9-hydroxyfluorine-carboxylic acid methyl ester are heated for about ½ hour to about 120° in an open flask. The mixture is dissolved in ether and diluted hydrochloric acid. The acid solution is extracted repeatedly with ether, to remove non-basic compounds. Ammonia is added, and pseudotropine-hydroxyfluorene carboxylic acid ester is precipitated. It is then treated in accordance with the further steps of Example 13.

We claim as our invention:

1. Esters of amino alcohols having a tertiary amino group, with 9-hydroxyfluorene-9-carboxylic acid.

2. Diethylamino-ethanol-9-hydroxyfluorene-9-carboxylic acid ester.

3. Hydroxyethyl-morpholine-9-hydroxyfluorene-9-carboxylic acid ester.

4. Hydroxyethyl-piperidine-9-hydroxyfluorene-9-carboxylic acid ester.

OTTO WOLFES.
OTTO HROMATKA.